3,027,325
OIL-SOLUBLE CALCIUM CARBONATE DISPERSIONS AND METHOD OF PREPARATION
Richard L. McMillen and Fred Corwin Goldsmith, Painesville, and John H. Gantz, Willoughby, Ohio, assignors to The Lubrizol Corporation, Wickliffe, Ohio, a corporation of Ohio
No Drawing. Filed Nov. 7, 1955, Ser. No. 545,550
8 Claims. (Cl. 252—33)

This invention relates to a process for the preparation of oil-soluble metallic compositions. In a more particular sense it relates to the preparation of such compositions which contain a calcium sulfonate plus a stoichiometrically excessive amount of metal.

The recent development of processes by which there are made available oil-soluble compositions containing a large amount of metal has led to the further discovery that this type of composition may be useful in a wide variety of applications. Such applications include, for example, the use of these compositions as ingredients in paint driers, roofing compositions, anti-rust agents, tanning agents, insecticidal sprays, lubricants, etc.

Previously known methods for the preparation of the above-described type of composition have included a variety of methods. Thus, it has been known that a normal metal salt which is oil-soluble can be used as a dispersing agent for a limited amount of the corresponding metal oxide or carbonate. Such dispersions may be prepared in some instances merely by heating a mixture of the normal metal sulfonate and the inorganic metal compound to be dispersed. Various refinements of this method involve the use of certain promoter materials, such as phenols, enols, aci-nitro compounds, alcohols, etc. which serve to enable the metal sulfonate to disperse greater quantities of the particular inorganic metal compound.

The very nature of the methods by which these dispersions are effected is quite unknown as is also an understanding of the molecular constitution of the products themselves. In each of the processes, however, by which any of such dispersions are prepared, the operating conditions are critical in many respects and it is important for the success of such process that certain conditions, e.g., temperature, moisture content, etc. be rather closely observed.

It is accordingly a principal object of the present invention to provide a novel process by which oil-soluble metallic compositions may be prepared.

It is also an object of this invention to provide a process for the preparation of oil-soluble metallic dispersions in which calcium sulfonate is the principal dispersing agent.

A further object is the provision of such a process which is both economical and convenient.

Other objects will be apparent from the following description.

The above objects are accomplished by the process of this invention by which there are prepared oil-soluble dispersions of calcium carbonate, said dispersions being stabilized by a calcium sulfonate. This process of preparing oil-soluble metal containing compositions comprises preparing a mixture containing (a) An oil-soluble calcium sulfonate;
(b) Calcium hydroxide;
(c) An alcohol; and
(d) Water, and treating said mixture with sufficient carbon dioxide to reduce the basicity of the mixture to an acid or base number within the range of 0 to about 10.0 as measured by ASTM method D974-53T using phenolphthalein indicator. For the purpose of the present specification and appended claims, a product having an acid or base number within this range shall be indicated as being substantially neutral.

The above process is particularly convenient and affords many economic advantages over previously known processes for the preparation of such calcium sulfonate dispersions as will be borne out by the more detailed description of the process which follows. Furthermore, the products which are available from the process have marked utility in the applications cited previously and particularly as additives for use in motor oil lubricants in which lubricants they serve as detergents or more properly as dispersants.

The oil-soluble calcium sulfonate which is specified above as ingredient $a$ in the process generally is a calcium petroleum sulfonate or a calcium salt of a synthetically prepared alkyl aromatic sulfonic acid. The calcium petroleum sulfonates are for the purposes of this invention derived from mahogany acids and are accordingly more correctly termed calcium mahogany sulfonates. As is well known in the art, they are prepared by the sulfonation of suitable petroleum fractions and after removal of the resulting acid sludge and purification of the sulfonic acid fraction, this sulfonic acid fraction is neutralized either by sodium hydroxide or sodium carbonate. The corresponding calcium salt then is generally prepared from this sodium sulfonate by a double decomposition reaction with calcium chloride. Such a product contains an appreciable amount of water and for the purposes of this invention generally at least some of this water is retained in the calcium sulfonate which is employed in the process.

The calcium salt of a synthetically prepared alkyl aromatic sulfonic acid may be prepared in much the same way. In this case, of course, the hydrocarbon which is used as the starting material usually is an alkylated benzene, such as for example, the Friedel-Crafts reaction product of benzene and a polymer fraction containing principally tetrapropylene. A particularly preferred starting material of this type is polydodecyl benzene. Its sulfonation and subsequent neutralization and double decomposition yields a calcium sulfonate which is quite satisfactory in the herein described process. As is the case with the above described calcium mahogany sulfonate, such a synthetic sulfonate likewise contains some water.

Component $b$, calcium hydroxide, is most conveniently used as such although calcium oxide may be substituted if enough water is present in the process mixture to convert all of the calcium oxide to calcium hydroxide and also to provide that which is necessary for the process itself. Any of the usual forms of calcium hydroxide are suitable. Thus any hydrates thereof may be used in the process.

The alcohol which is used may be either monohydroxy or polyhydroxy and it may or may not contain aromatic substituents. While the monohydric alcohols are preferred because of their economical as well as processing advantages, other alcohols may in certain instances be used however. Broadly, those organic compounds which contain a hydroxyl group attached to an aliphatic carbon atom to which there are attached also only carbon and/or hydrogen, are regarded as "alcohols" for the purposes of the description of the process. As indicated above, however, the monohydric and especially the low molecular weight monohydric alcohols are preferred. This is so not only because of their particular effectiveness in the process, but also because of the ease of removal of such alcohols from the process mixture at the conclusion of the reaction.

Specific and representative examples of suitable alcohols include the following: methyl, ethyl, isopropyl, n-butyl, isoamyl, 2-ethylhexyl, decyl, beta-phenyl ethyl, benzyl, cyclohexyl, methylcyclohexyl, ethylene glycol, glycerin, propylene glycol, etc.

With regard to the use of water in the process, it has been found that at least a small amount of water is essential. If the same process is carried out in the absence of water, the amount of metal incorporated in the final product is considerably lessened thereby, the filterability of the process mixture is poor and clarity of the product is unsatisfactory. The amount of water, the use of which mitigates these problems, is not necessarily large and may in many instances be taken care of merely by a moisture content in the calcium sulfonate starting material of as little as one percent.

It is for this reason that some of the water which is present in the crude calcium sulfonate obtained from the double decomposition reaction is intentionally retained in the calcium sulfonate.

One of the striking advantages of the process resides in the fact that it may be carried out at reasonable temperatures. A particularly preferred range of temperature is that of 30 to 70° C. and in most cases a temperature of about 40° C. is entirely satisfactory. In some special cases temperatures lower than this may be employed and in other particular cases higher temperatures may be employed within the limitations imposed by the boiling point of the alcohol which is used in the process.

As indicated earlier, one of the features of the process of this invention is that large amounts of ordinarily oil-insoluble inorganic metal compound can be dispersed in oil-soluble form. For convenience of comparison, this relatively large proportion of ordinarily oil-insoluble calcium metal compound can be considered with respect to the amount of calcium sulfonate present in the same solution. If the amount of calcium sulfonate in such a solution is regarded as unity, the relative number of equivalents of oil-insoluble inorganic calcium compound is then a measure of the stoichiometrically excessive amount of metal present in the solution and this number of equivalents plus one is known as the "metal ratio." Thus, the metal ratio is the ratio of total amount of calcium present in the solution to the amount of calcium sulfonate present therein on a chemical equivalent basis. The use of such terminology allows a ready comparison of the products of the process of this invention.

A wide range of metal ratios is available from this process and may extend from slightly above one up to as high as seven or eight and even higher.

Ordinarily when the process has been completed, there will remain in the process mixture appreciable amounts of the alcohol which has been used in the process and in many instances it is desirable to remove this alcohol. This may be accomplished conveniently by distillation and frequently it is desirable to remove the last traces of the alcohol by distillation under reduced pressure. This has the additional and desirable effect of removing also the last traces of moisture which may have remained in the process mixture.

The products which are prepared by this process are easily filterable, clear, oil-soluble, non-viscous liquids. Inasmuch as the calcium sulfonate starting material usually is present in oil solution, the product likewise will contain a significant quantity of oil.

The effect of the treatment with carbon dioxide is a reduction in the basicity of the product and to the extent of such treatment with carbon dioxide an increasingly neutral product may be obtained.

It is, in fact, preferred to carry out the process so as to obtain a product which is of considerably reduced basicity or even of slight acidity, i.e., an acid or base number of from 0 to about 10.

The following examples afford a more detailed illustration of the invention.

*Example 1*

A mixture of 1045 grams (1.0 equivalent) of a 45 percent oil solution of calcium mahogany sulfonate containing one percent of moisture, 254 grams (7.0 equivalents) of calcium hydroxide, and 251 grams of methanol was prepared, heated to 40° C. and then treated with carbon dioxide at 40 to 45° C. for nine hours. The crude mixture then was heated to 150° C. diluted with 790 grams of mineral oil, and filtered through Hyflo. The clear, brown, non-viscous, filtrate showed the following analyses:

Percent sulfate ash_____ 22.2.
Neut. No_____ 0.4 (acidic).
Metal ratio_____ 7.1.

*Example 2*

A mixture of 1045 grams (1.0 equivalent) of a 45 percent oil solution of mixed calcium mahogany sulfonate and calcium polydodecyl benzene sulfonate containing one percent moisture, 259 grams (7.0 equivalents) of calcium hydroxide, 126 grams of methanol, and 790 grams of mineral oil was heated at reflux temperature for one hour, then treated with carbon dioxide for 4.2 hours at 40 to 45° C. The mixture then was heated to 150° C. and filtered through Hyflo. The clear, brown, non-viscous filtrate showed the following analyses:

Percent sulfate ash_____ 21.3.
Neut. No_____ 1.2 (acidic).
Metal ratio_____ 6.9.

*Example 3*

A mixture of 2090 grams (2.0 equivalents) of a 45 percent oil solution of calcium mahogany sulfonate containing one percent of moisture, 370 grams (10.0 equivalents) of calcium hydroxide and 251 grams of methanol was heated at reflux temperature for an hour. It then was cooled to 40° C., whereupon carbon dioxide was bubbled through the mixture for 14 hours. The thus neutralized mixture was heated to 150° C., held at this temperature for an hour, and then filtered through Hyflo. The resulting liquid product showed the following analyses:

Percent sulfate ash_____ 30.0.
Neut. No_____ 0.9 (acidic).
Metal ratio_____ 5.7.

*Example 4*

A mixture of 74 grams (2.0 equivalents) of calcium hydroxide, 167 grams of water and 251 grams of isopropyl alcohol was heated at reflux temperature for one hour, and then treated with 2090 grams of a 45 percent oil solution of calcium mahogany sulfonate. Carbon dioxide then was bubbled through the mixture at 40 to 45° C. for 2.2 hours. The isopropyl alcohol and water were removed by heating the mixture to 150° C. after which the residue was filtered through Hyflo. The filtrate showed the following analyses:

Percent sulfate ash_____ 12.1.
Neut. No_____ 2.8 (basic).
Metal ratio_____ 2.0.

*Example 5*

A mixture of 2090 grams (2.0 equivalents) of a 45 percent oil solution of calcium mahogany sulfonate containing one percent of moisture, 74 grams (2.0 equivalents) of calcium hydroxide and 251 grams of ethylene glycol was heated for one hour at 100° C. Carbon dioxide was bubbled through this mixture at 40 to 45° C. for 5.5 hours. The ethylene glycol was removed by heating to a final temperature of 185° C./10.2 mm. The residue was filtered through Hyflo to yield a clear filtrate having the following analyses:

Percent sulfate ash_____ 12.9.
Neut. No_____ 5.0 (acidic).
Metal ratio_____ 2.0.

*Example 6*

A slurry of 74 grams (2.0 equivalents) of calcium hydroxide in 251 grams of ethanol was heated at reflux temperature for one hour. To this there was added 2090 grams (2.0 equivalents) of a 45 percent oil solution of calcium mahogany sulfonate containing one percent of moisture. This mixture was treated with carbon dioxide for 4.5 hours at 40 to 45° C. The resulting product was heated to 150° C., then filtered through Hyflo to yield a liquid having the following analyses:

Percent sulfate ash _____ 11.4.
Neut. No _____ 0.7 (basic).
Metal ratio _____ 1.8.

*Example 7*

A solution of 185 grams (5.0 equivalents) of calcium hydroxide in 251 grams of isopropyl alcohol and 167 grams of water was heated under reflux for one hour. To this solution there was added 2090 grams (2.0 equivalents) of a 45 percent oil solution of calcium mahogany sulfonate. The temperature was adjusted to 40 to 45° C. and carbon dioxide was bubbled through the mixture for 1.8 hours at which point the neut. number was 12.4 (basic). The mixture then was heated to 150° C. and treated for an additional hour at this temperature with carbon dioxide. The mixture was diluted with benzene, filtered through Hyflo and the filtrate concentrated by heating to a final temperature of 150° C./30 mm. The residue was a clear, brown, slightly viscous liquid having the following analyses:

Percent sulfate ash _____ 12.3.
Neut. No _____ 0.7 (acidic).
Metal ratio _____ 2.0.

Other modes of applying the principle of the invention may be employed, change being made as regards the details described, provided the features stated in any of the following claims, or the equivalent of such, be employed.

We, therefore, particularly point out and distinctly claim as our invention:

1. The process of preparing oil-soluble metal containing compositions which comprises mixing (a) a petroleum oil solution of a calcium sulfonate selected from the class consisting of calcium petroleum sulfonates and calcium salts of synthetically prepared alkyl aromatic sulfonic acids;
   (b) calcium hydroxide;
   (c) at least about 0.5 equivalent of an alcohol based on the amount of component b; and
   (d) at least about 1% water based on the amount of component a; and bubbling carbon dioxide into the resulting mixture until it is substantially neutral, at a temperature above about 30° C. and below the boiling point of component c.

2. The process of claim 1 characterized further in that the oil-soluble calcium sulfonate of (a) is a calcium mahogany sulfonate.
3. The process of claim 1 characterized further in that the calcium hydroxide of (b) is formed in situ by the reaction of calcium oxide and a portion of the water of (d).
4. The process of claim 1 characterized further in that the alcohol of (c) is a monohydric alcohol.
5. The process of claim 1 characterized further in that the alcohol of (c) is a primary saturated aliphatic alcohol.
6. The process of claim 1 characterized further in that the alcohol of (c) is methanol.
7. The process of preparing oil-soluble metal containing compositions which comprises mixing (a) a petroleum oil solution of a calcium mahogany sulfonate;
   (b) from about 1.0 to about 10.0 equivalents of calcium hydroxide based on the amount of calcium mahogany sulfonate;
   (c) from about 0.5 to about 5.0 equivalents of a monohydric alcohol based on the amount of calcium hydroxide; and
   (d) from about 0.5 to about 5.0 equivalents of water based on the amount of calcium mahogany sulfonate; and bubbling carbon dioxide into the resulting mixture until it is as substantially neutral, at a temperature above about 30° C. but below the boiling point of component c.

8. The process of claim 7 characterized further in that the treatment with carbon dioxide is carried out at a temperature within the range of 30 to 70° C.

References Cited in the file of this patent

UNITED STATES PATENTS

| | | |
|---|---|---|
| 2,417,428 | McLennan | Mar. 18, 1947 |
| 2,501,732 | Mertes | Mar. 28, 1950 |
| 2,723,235 | Asseff | Nov. 8, 1955 |
| 2,767,209 | Asseff et al. | Oct. 16, 1956 |
| 2,861,951 | Carlyle | Nov. 25, 1958 |
| 2,865,956 | Ellis et al. | Dec. 23, 1958 |
| 2,956,018 | Carlyle et al. | Oct. 11, 1960 |